Figure 1:
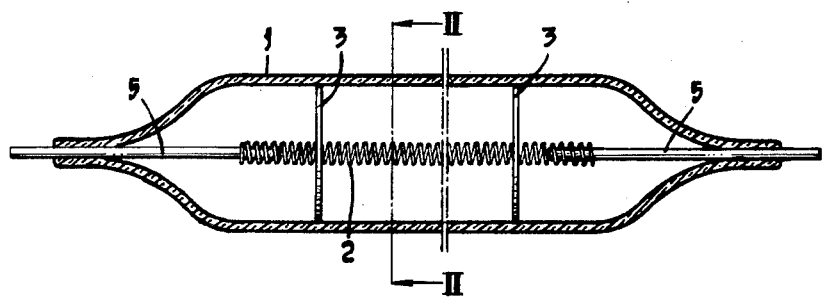

Dec. 28, 1965   H. A. VAN BAKEL ETAL   3,226,249
METHOD OF PROVIDING LIGHT DIFFUSING COATINGS ON QUARTZ
AND QUARTZ OBJECTS PROVIDED WITH SUCH COATINGS
Filed Sept. 11, 1961

INVENTOR
HENRICUS A. VAN BAKEL
PAUL B.T.H. SPREUWENBERG
BY
AGENT

United States Patent Office 3,226,249
Patented Dec. 28, 1965

3,226,249
METHOD OF PROVIDING LIGHT DIFFUSING COATINGS ON QUARTZ AND QUARTZ OBJECTS PROVIDED WITH SUCH COATINGS
Henricus Antonius Van Bakel and Paul Bernard Tonny Hubertina Spreuwenberg, Eindhoven, Netherlands, assignors to North American Philips Company, Inc., New York, N.Y., a corporation of Delaware
Filed Sept. 11, 1961, Ser. No. 137,142
Claims priority, application Netherlands, Oct. 24, 1960, 257,187
2 Claims. (Cl. 117—119.6)

The invention relates to a method of providing light diffusing coatings on quartz and quartz objects provided with such coatings.

The physical and chemical properties of quartz render this material particularly suited for manufacturing articles to be exposed to high temperatures. For example, quartz is employed in the envelope of a tubular infra-red radiator, the temperature of which may rise to from 800° C. to 900° C.

For many applications in the field of lighting, light diffusing coatings on a quartz surface are required. However, the high operating temperatures impose stringent requirements on these coatings. Hence, metal mirrors generally are unsuitable. In some uses, for example in in tubular lamps, the light diffusing coating must be provided on the outer surface of the lamp. In these circumstances, the light diffusing coating also must have a high resistance to mechanical, physical and chemical influences.

Although light-diffusing layers on glass have been provided by applying a suspension of the metal compound to the glass and heating the whole to a temperature below the softening temperature of the glass, the resulting coatings, however, generally are not scratch-resistant, since a sufficient adherence to the glass surface cannot be achieved. If heating should be continued for a period sufficient to produce satisfactory adherence, a considerable amount of the metal compound diffuses into the glass, so that the coating becomes too transparent or even completely clear, while furthermore the mechanical properties of the glass are adversely affected. For this reason, usually short-time heating is employed and in filament lamps the coating is provided on the inner surface.

An object of our invention is the provision of light-diffusing coatings on quartz, which are scratch-resistant and physically and chemically stable up to temperatures of the order of 1000° C.

In accordance with our invention we have found that such coatings may be obtained by sintering a metal compound, the melting or decomposition temperature of which lies above the sintering temperature used, onto the quartz at a temperature between 1000° C. and 1500° C.

By the method according to the invention, light diffusing coatings may be obtained with metal oxides such as MgO, ZnO, $Al_2O_3$, $TiO_2$, $ThO_2$ and $ZrO_2$, and with salts such as $AlPO_4$, $SrSiO_3$ and $BaSO_4$.

Colored coatings may also be obtained, for example by using $Fe_2O_3$ or $Cr_2O_3$.

The metal compound may be applied to the quartz surface as a suspension in a suitable liquid. A suspension in water may be used, but a suspension in an organic solvent containing a binder has proved particularly suitable. Suitable binding agents are for example, collodion, nitrocellulose, polyvinyl compounds, polyoxyethylene compounds and the like. By means of the method according to the invention, coatings ranging from transparent to substantially reflecting may be obtained. With $Al_2O_3$ and/or $TiO_2$, for example, coatings may be obtained with reflect from 50 to 70% of the incident light. We have also found that a mixture of $Al_2O_3$ and $TiO_2$, which preferably contains at least 15% by weight and at most 95% by weight of $TiO_2$, is particularly suited to the manufacture of mirrors having such a reflection. The adherence of these mixtures to quartz has proven to be better than that of either metal oxide.

Sintering may be carried out in an electric furnace or with a gas burner.

The method according to the invention will now be illustrated by the following examples.

EXAMPLE I 50 gm. of metal oxide were ground together with 250 mls. of butyl acetate and 6.6 gm. of nitrocellulose in a ball mill for 24 hours. The resulting suspension was applied to a quartz surface as a film having a thickness of from about 0.01 to 0.05 mm. The whole was then sintered at a temperature of 1200° C. for about three minutes. In Table I a number of results of this method are tabulated:

Table I

| Metal Oxide | Adherence | Degree of Light Diffusion |
|---|---|---|
| MgO | Satisfactory | Transparent. |
| ZnO | do | Satin appearance. |
| $Al_2O_3$ | Good | Reflecting. |
| $TiO_2$ | do | Do. |
| $ThO_2$ | do | Transparent. |
| $ZrO_2$ | Satisfactory | Matte appearance. |

By increasing the sintering temperature, the adherence is improved and the transparency reduced. Thus, at 1400° C. reflecting coatings were obtained with metal compounds which provided a transparent coating at 1200° C.

Figure 2:
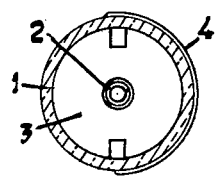

The invention will also be described in connection with the accompanying drawing in which:

FIG. 1 is a longitudinal sectional view of the lamp according to the invention; and FIG. 2 is a cross-sectional view taken at right angles to the lamp filament.

FIG. 1 shows a quartz tube 1 sealed at both ends. A filament 2 is connected to supply leads 5 brought out through the quartz.

FIG. 2 is a cross-sectional view taken along the line II—II of FIG. 1 at right angles to the filament. A reflecting coating 4 may be provided either before or after the sealing of the quartz tube. A filament support is designated 3.

EXAMPLE II

The reflecting coating for the lamp was provided in the following manner:

40 gm. of $Al_2O_3$ and
10 gm. of $TiO_2$ were ground together with 50 mls. of butyl acetate and 6.6 gm. of nitrocellulose in a ball mill for 24 hours. One half of the outer surface of the quartz tube 1 was coated throughout its length with a layer of this suspension of a thickness of about 0.025 mm.

The coating was sintered at a temperature of 1200° C. for 3 minutes. To prevent the suspension from finding its way to areas where it was not desired, a suitable jig was employed. Alternatively, these areas may be covered, or lacquered with a suitable material.

The surplus of output of directed light was ascertained in the following manner:

The amount of energy emitted in a direction at right-angles to the longitudinal axes of the mirror and of the filament was measured and compared with the amount of energy emitted by a corresponding lamp which was not provided with a reflecting coating. The radiation energy of the untreated lamp is assumed to be 100%.

Table II shows the values measured for a coating made by the method described in this example and for a coating consisting solely of $Al_2O_3$ but produced in the same manner.

*Table II*

| Metal oxide: | Output of light, percent |
|---|---|
| $Al_2O_3/TiO_2$ (80/20) | 170 |
| $Al_2O_3$ | 165–167 |

EXAMPLE III

The heat dissipation of high-pressure mercury vapour lamps may be such that the vapour pressure of the mercury does not reach the value required for satisfactory operation of these lamps. Endeavours to reduce the heat dissipation by the provision of a platinum or silver mirror on the quartz tube failed because of the poor stability of these mirrors.

If the lamps were provided with a reflecting mirror of the kind described in Example II, the reflection proved sufficient to bring the mercury to the required vapour pressure.

It was surprising to find that with quartz a short sintering period is sufficient to provide a scratch-resistant coating without the mechanical strength being adversely affected. This enables the coatings to be provided on the outer surface. Particularly in tubular lamps, this is a material advantage, since the manufacture of these lamps is greatly simplified and a reliable product is obtained.

While we have described our invention in connection with specific examples and embodiments thereof, other modifications will be readily apparent to those skilled in this art without departing from the spirit and scope thereof as defined in the appended claims.

What we claim is:
1. A method of providing an adherent light-diffusing coating on a transparent quartz substrate comprising the steps, applying to the substrate a coating material consisting of about 15 to 95% by weight of $TiO_2$ and the balance $Al_2O_3$, and sintering the thus applied coating at a temperature of about 1000° to 1500° C. for a sufficient time to form an adherent layer of said coating material on said substrate.
2. As an article of manufacture, a transparent quartz substrate having a light-diffusing coating thereon consisting of a sintered layer of about 15 to 95% by weight of $TiO_2$ and the balance $Al_2O_3$.

References Cited by the Examiner

UNITED STATES PATENTS

| | | | |
|---|---|---|---|
| 1,884,665 | 10/1932 | Greiner | 117—23 |
| 1,968,822 | 8/1934 | Gaides et al. | 117—124 |
| 2,118,795 | 5/1938 | Littleton | 117—123 |
| 2,179,381 | 11/1939 | Palmateer | 117—123 |
| 2,194,189 | 3/1940 | Wheeler et al. | 117—123 |
| 2,195,436 | 4/1940 | Weller | 117—123 |
| 2,328,101 | 8/1943 | Rosenblatt | 117—123 |
| 2,362,489 | 11/1944 | Jewett | 117—123 |
| 2,564,708 | 8/1951 | Mochel | 117—169 X |
| 2,590,893 | 4/1952 | Sanborn | 117—169 X |
| 2,727,830 | 12/1955 | Janssen et al. | 117—124 |
| 2,758,510 | 8/1956 | Auwarter. | |
| 2,766,032 | 10/1956 | Meister et al. | 117—169 X |
| 2,898,243 | 8/1959 | Wenden | 117—169 |
| 2,946,703 | 7/1960 | Thompson | 117—123 |
| 2,972,555 | 2/1961 | Deutscher | 117—123 |
| 2,989,421 | 6/1961 | Novak | 117—123 |
| 3,002,855 | 10/1961 | Phillips et al. | 117—123 |
| 3,004,863 | 10/1961 | Gray et al. | 117—124 |
| 3,004,875 | 10/1961 | Lytle | 117—124 |

RICHARD D. NEVIUS, *Primary Examiner.*